United States Patent
Francois et al.

(10) Patent No.: US 8,755,436 B2
(45) Date of Patent: Jun. 17, 2014

(54) METHOD OF CODING, DECODING, CODER AND DECODER

(75) Inventors: Edouard Francois, Bourg des Comptes (FR); Olivier Le Meur, Talensac (FR); Jerome Vieron, Paris (FR)

(73) Assignee: Thomson Licensing, Issy les Moulineaux (FR)

( * ) Notice: Subject to any disclaimer, the term of this patent is extended or adjusted under 35 U.S.C. 154(b) by 805 days.

(21) Appl. No.: 12/736,613

(22) PCT Filed: Apr. 23, 2009

(86) PCT No.: PCT/FR2009/050753
§ 371 (c)(1),
(2), (4) Date: Mar. 22, 2011

(87) PCT Pub. No.: WO2009/138666
PCT Pub. Date: Nov. 19, 2009

(65) Prior Publication Data
US 2011/0170599 A1    Jul. 14, 2011

(30) Foreign Application Priority Data
Apr. 25, 2008 (FR) .................................... 08 52792

(51) Int. Cl.
*H04N 7/26* (2006.01)
(52) U.S. Cl.
CPC ................................ *H04N 19/00024* (2013.01)
USPC ...................................................... 375/240.16
(58) Field of Classification Search
None
See application file for complete search history.

(56) References Cited

FOREIGN PATENT DOCUMENTS

JP          09182043         7/1997

OTHER PUBLICATIONS

Wei Lai et al., "A content-based bit allocation model for video streaming," 2004 IEEE International Conference on Multimedia and Expo.*
Hongliang Li et al., "Unsupervised Video Segmentation with Low Depth of Field," IEEE Transactions on Circuits and Systems for Video Technology, vol. 17, No. 12, Dec. 2007.*
Zhenzhong Chen et al., "Dynamic Bit Allocation for Multiple Video Object Coding," IEEE Transactions on Multimedia, vol. 8, No. 6, Dec. 2006.*

(Continued)

*Primary Examiner* — Andy Rao
*Assistant Examiner* — Tyler Edwards
(74) *Attorney, Agent, or Firm* — Tutunjian & Bitetto, P.C.

(57) ABSTRACT

A method for coding a picture portion of a picure of a video sequence is disclosed, at least one picture of the video sequence being a key picture. The method comprises the following steps:
  a) calculate a saliency map of the key picture,
  b) estimate for the picture portion to be coded, at least one motion vector pointing towards a portion of the key picture,
  c) motion compensate at least one portion of the saliency map using an estimated motion vector to obtain, for said picture portion, at least one portion of the predicted saliency map, and
  d) code the picture portion according to the saliency level of the portion of the predicted saliency map.

Figure 1:
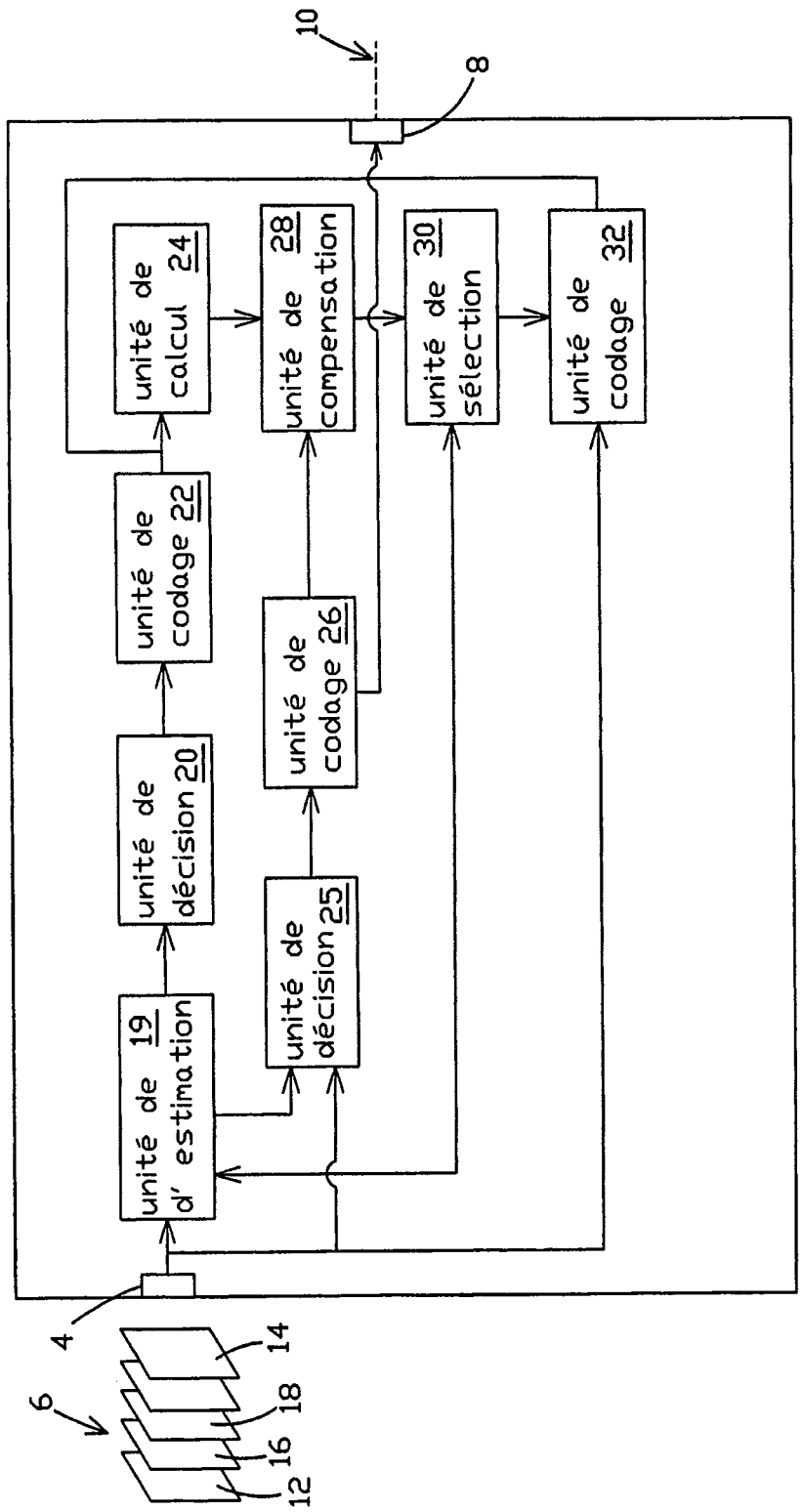

The invention also relates to a method for decoding a binary stream, a coder able to code pictures of a video sequence and a decoder of a binary stream.

13 Claims, 6 Drawing Sheets

(56) References Cited

OTHER PUBLICATIONS

Chih-Wei Tang, "Spatiotemporal Visual Considerations for Video Coding," IEEE Transactions on Multimedia, vol. 9, No. 2, Feb. 2007.*

Schwarz et al., "Overview of the Scalable Video Coding Extension of the H.264/AVC Standard," IEEE Transactions on Circuits and Systems for Video Technology, vol. 17, No. 9, Sep. 2007.*

Lai et al., "A Content-Based Bit Allocation Model for Video Streaming", 2004 IEEE International Conference on Multimedia and Expo (ICME), vol. 2, Piscataway, NJ, pp. 1315-1318.

Tang, "Spatiotemporal Visual Considerations for Video Coding", IEEE Transactions on Multimedia, vol. 9, No. 1, Piscataway, NJ, Feb. 1, 2007.

Li et al., "Unsupervized Video Segmentation with Low Depth of Field", IEEE Transactions on Circuits and Systems for Video Technology, vol. 17, No. 12, Dec. 2007, pp. 1742-1751.

Chen et al., "Dynamic Bit Allocation for Multiple Video Object Coding" IEEE Transactions on Multimedia, vol. 8, No. 6, Piscataway, NJ, Dec. 1, 2006, pp. 117-1124.

Ostermann et al., "Natural and Synthetic Video in MPEG-4", Acoustics, Speech and Signal Processing, 1998, vol. 6, Seattle, WA, May 12-15, 1998, pp. 3805-3808.

Schwarz et al., "Overview of the Scalable Video Coding Extension of the H.264/AVC Standard", IEEE Transactions on Circuits and Systems for Video Technology, vol. 17, No. 9, Piscataway, NJ, Sep. 9, 2007.

Search Report Dated Jan. 14, 2010.

* cited by examiner

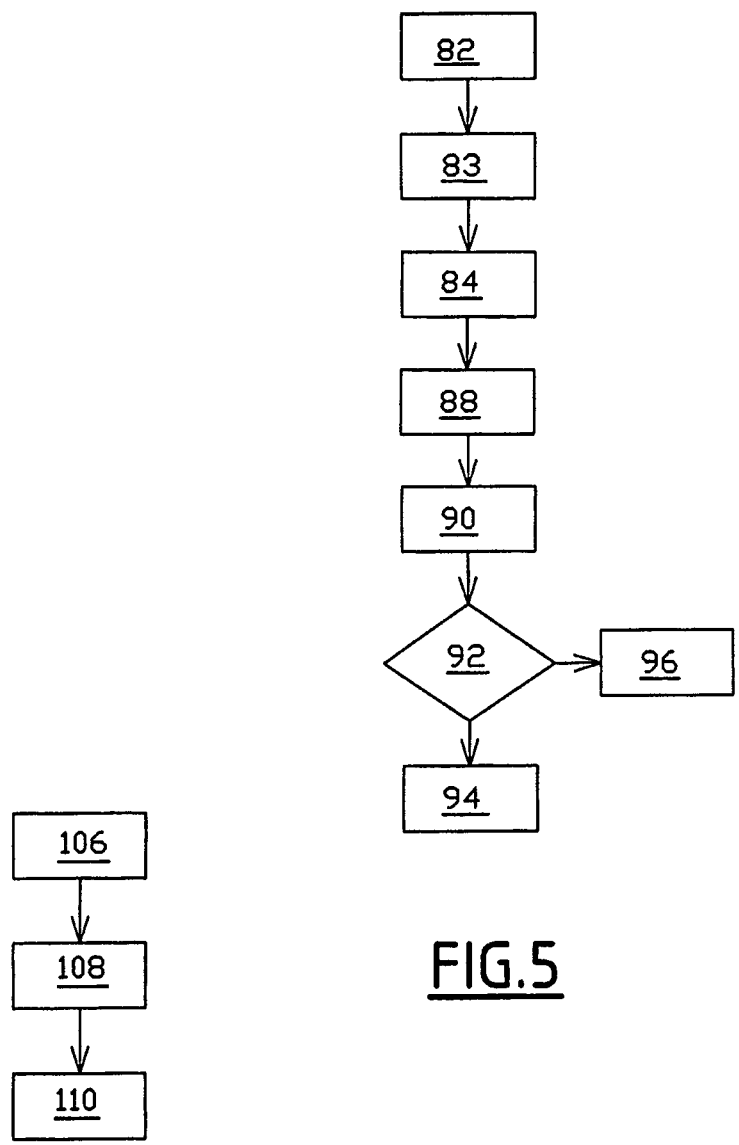

METHOD OF CODING, DECODING, CODER AND DECODER

The present invention relates to a coding method, a decoding method, a coder and a decoder.

This application claims the benefit, under 35 U.S.C. §365 of International Application PCT/FR2009/050753, filed Apr. 23, 2009, which was published in accordance with PCT Article 21(2) on Nov. 19, 2009 in French and which claims the benefit of French patent application No. 0852792, filed Apr. 25, 2008.

The MPEG (Moving Picture Expert Group) and ITU (International Telecommunication Union) standardization bodies have defined numerous video compression standards such as MPEG1, MPEG2, MPEG4 and H.264. The efficiency in compression of these different standards has enabled the emergence of numerous video applications.

Nevertheless, despite ever improving performances, the problem of video compression still remains current and it is still necessary to attempt to increase the compression rate at a constant quality, to enable the development of new emerging services such as the distribution of high quality video over an Internet network or of video on mobile telephones.

The purpose of the invention is to propose a coding and decoding method enabling the data compression rate to be increased while preserving the visual yield of reconstructed pictures.

To this end, the purpose of the invention is a method for coding a picture portion of a picture of a video sequence, at least one picture of the video sequence being a key picture, characterized in that the method comprises the following steps to:

a) calculating a saliency map of the key picture or of each key picture, b) estimating for the picture portion to be coded, at least one motion vector (V1, V2) pointing towards a part of the key picture or of each key picture, c) motion compensating at least one portion of the saliency map using estimated motion vector(s) (V1, V2) to obtain, for said picture portion, at least a portion of the predicted saliency map, and d) coding the picture portion according to the saliency level of the portion or each portion of the predicted saliency map.

According to the specific implementation modes, the coding procedure comprises one or more of the following characteristics, taken separately or in combination:

step d) comprises the following steps:
  determining the saliency level of the portion(s) of the predicted saliency map,
  comparing a predefined saliency level (S1) and the saliency level (S) of the portion of the predicted saliency map, and
  coding the picture portion using a method selected according to the result of said comparison, said method being selected from at least a first and a second method,
the first coding method is defined by the standard H.264, the second coding method being a method based on the H.264 standard in which the amplitude of the components of each motion vector (V1, V2) is greater than ¼ pixel,
the second coding method comprises an motion interpolation based on an interpolation filter other than the filter used in the first method, and a step of coding and transmission of motion information defined by the affine parameters,
the picture portion of a picture of a video sequence is coded according to a compression by scalable layers method, the key pictures being destined to be coded in a base layer, the picture portion being coded in a high level, the coding method also comprises the following steps:
  estimate a motion vector (V5) from a portion of a second intermediary picture and pointing towards at least a part of a portion of a first intermediary picture,
  count the number of pixels of the part of the portion of the first intermediary picture.

When the number of pixels counted is greater than a pre-defined number (Nmin), the coding method comprises the following step:
  code the portion of the second intermediary picture using the portion of the first intermediary picture and by the method selected to code the portion of the first intermediary picture,
  during a bi-directional coding of a portion of an intermediary picture from a portion of the first key picture and a portion of the second key picture, the saliency level (S) compared to the level of the pre-defined saliency level (S1) being a function of the saliency level (S12) of a first portion of the saliency map predicted from a first motion vector (V1), and saliency level (S14) of a second portion of this saliency map predicted from a second motion vector (V2), said portion of the intermediary picture being coded from a mean of predictions of the portion of the first key picture and the portion of the second key picture, said mean being weighted by said saliency levels (S12, S14) of the first and second portions of the predicted saliency maps,
  step a) comprises a coding step of the key picture or each key picture, said step generating reconstructed key pictures, the saliency map being calculated from the reconstructed key picture(s)

The method of the invention also comprises a decoding method of a binary stream comprising compressed data representative of motion vectors (V1, V2), of pictures and key pictures of a video sequence with a view to the reconstruction of a part of the picture to be reconstructed. According to the specific embodiments it comprises the following steps:

a) reconstructing the key picture or each key picture from the compressed data, a) calculating a saliency map of the reconstructed key picture or of each reconstructed key picture, c) decoding at least one motion vector (V1, V2) for the picture part to be reconstructed pointing towards a part of the key picture, c) motion compensating at least one portion of the saliency map using the decoded motion vector (V1, V2) to obtain, for said picture portion to be reconstructed, a part of the predicted saliency map, and e) reconstructing the picture portion to be reconstructed according to the saliency level of the predicted saliency map,
  determining the saliency level of the portion or each portion of the predicted saliency map,
  comparing the pre-defined saliency level (S1) and the saliency level (S) of the portion of the pre-defined saliency map, and
  reconstructing the portion of the picture to be reconstructed using a method selected according to the result of said comparison, said method being selected from among at least a first and second method.

the picture portion of a picture of a video sequence is decoded according to a compression method scalable by layers, the reconstruction of compressed data of a base layer generating the key pictures, the reconstruction of the compressed data of a high level generating the picture portion to be reconstructed, the method can also comprise the following steps:

decoding at least one motion vector (V1, V2) from a portion of a second intermediary picture and pointing towards at least part of a portion of a first decoded intermediary picture, the method also comprising the following steps:

counting the number of pixels of the part of the portion of the first decoded intermediary picture.

When the number of pixels counted is greater than a predefined number (Nmin), the method comprises the following steps:

reconstructing the portion of the second intermediary picture using the portion of the first intermediary picture and by the method selected to reconstruct the portion of the first intermediary picture, during a reconstruction of a portion of an intermediary picture coded according to a bi-directional prediction from a portion of the first key picture and a portion of the second key picture, the saliency level (S) compared with the predefined saliency level (S1) is a function of the saliency level (S12) of a first portion of the saliency map predicted from a first motion vector (V1), and the saliency level (S14) of a second portion of the saliency map predicted from a second motion vector (V2), said intermediary picture portion being reconstructed from a mean of predictions of the portion of the first key picture and the portion of the second key picture, said mean being weighted by said saliency levels (S12, S14) of the first and second portions of the predicted saliency map.

Moreover, the invention also relates to a coder able to code picture of a video sequence, at least one picture being a key picture, characterised in that the coder comprises:

a calculation unit of a saliency map of the key picture or each key picture, an estimation unit able to estimate for the portion of the picture to be coded at least one motion vector (V1, V2) pointing towards a portion of the key picture or each key picture, a compensation unit able to motion compensate the portion(s) of the saliency map using the estimated motion vector(s) (V1, V2) to obtain, for said portion of the picture, at least one portion of the saliency map, and a coding unit able to code the portion of the picture according to the saliency level of the portion(s) of the predicted saliency map.

Finally, the invention relates to a decoder of a binary stream comprising compressed data representing motion vectors (V1, V2), of pictures and key pictures of a video sequence with a view to reconstruction of a portion of the picture to be reconstructed, the decoder comprising:

a reconstruction unit of the key picture(s) from the compressed data, a calculation unit of the saliency map of the reconstructed key picture(s)

a decoding unit able to decode at least one motion vector (V1, V2) for the portion of the picture to be reconstructed (54) pointing towards a portion of the key picture(s), a motion compensation unit able to motion compensate at least one portion of the saliency map using a decoded motion vector (V1, V2) to obtain for said portion of the picture to be reconstructed, a portion of the predicted saliency map, and a reconstruction unit able to reconstruct the portion of the picture to be reconstructed according to the saliency level of the portion of the predicted saliency map.

Figure 2:
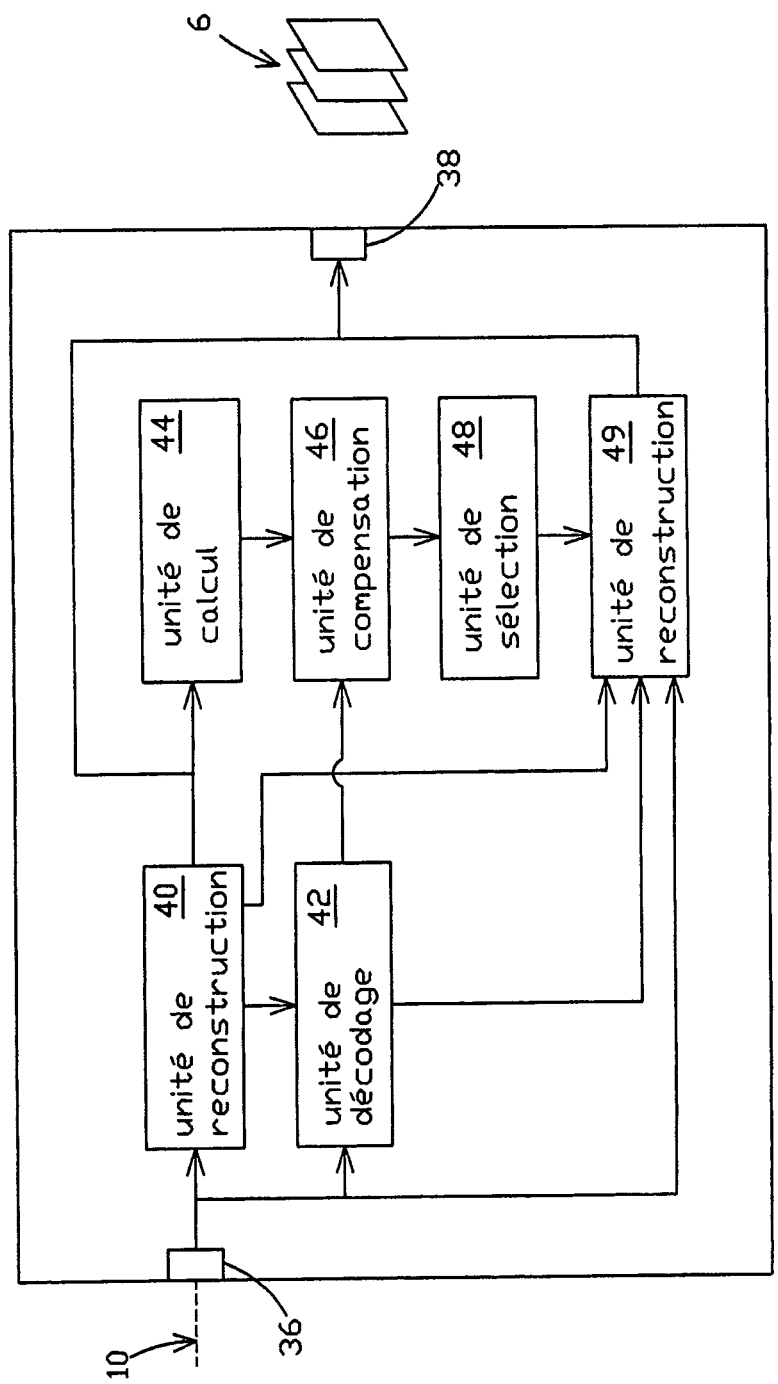
Figure 3:
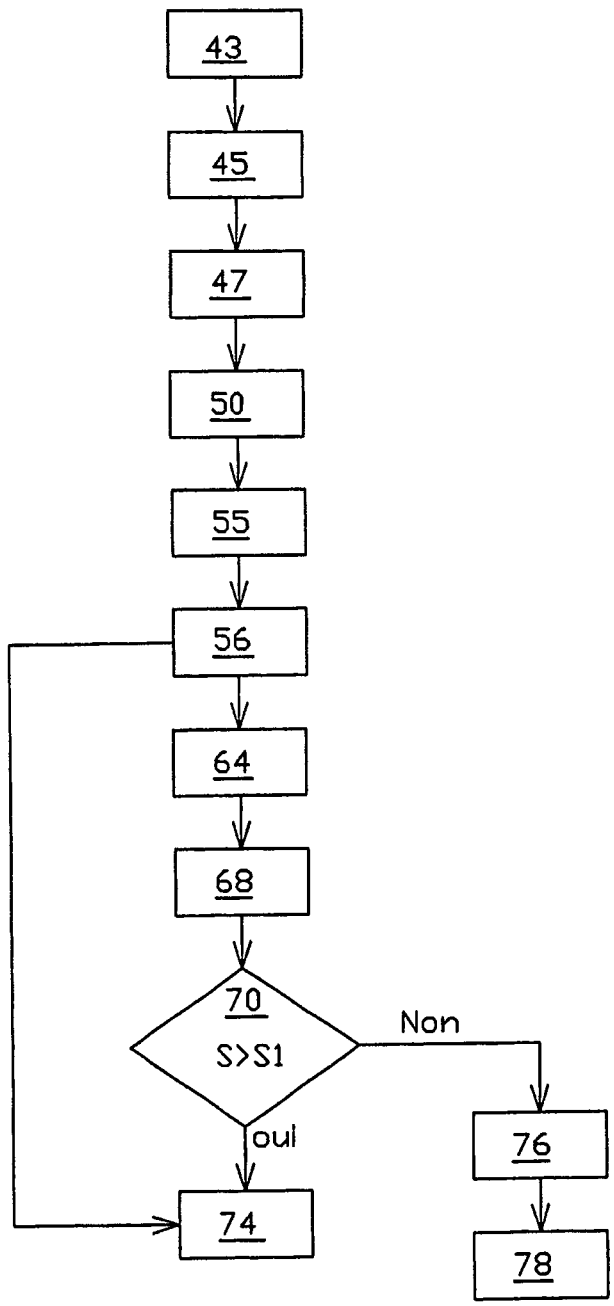
Figure 4:
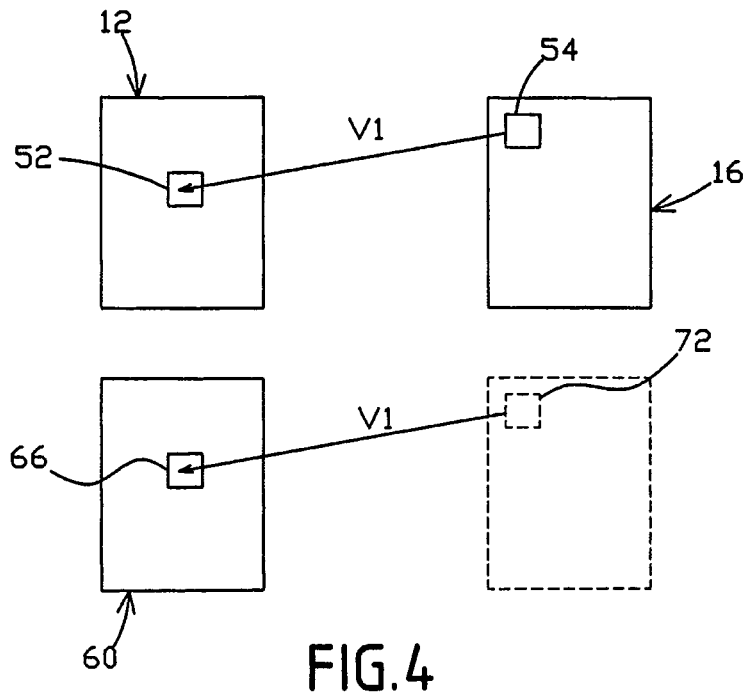
Figure 6:
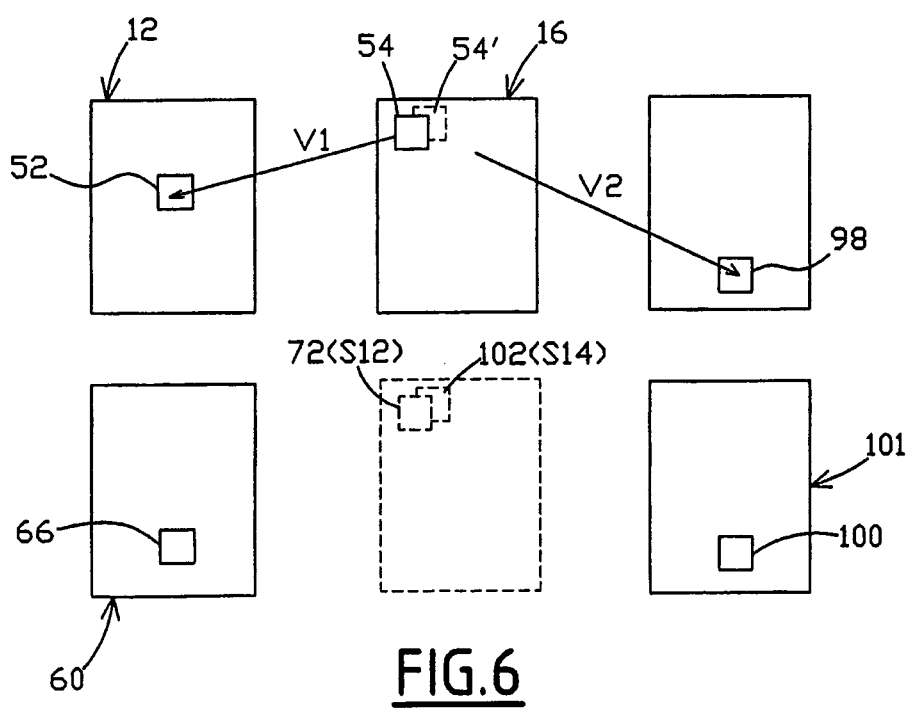
Figure 7:
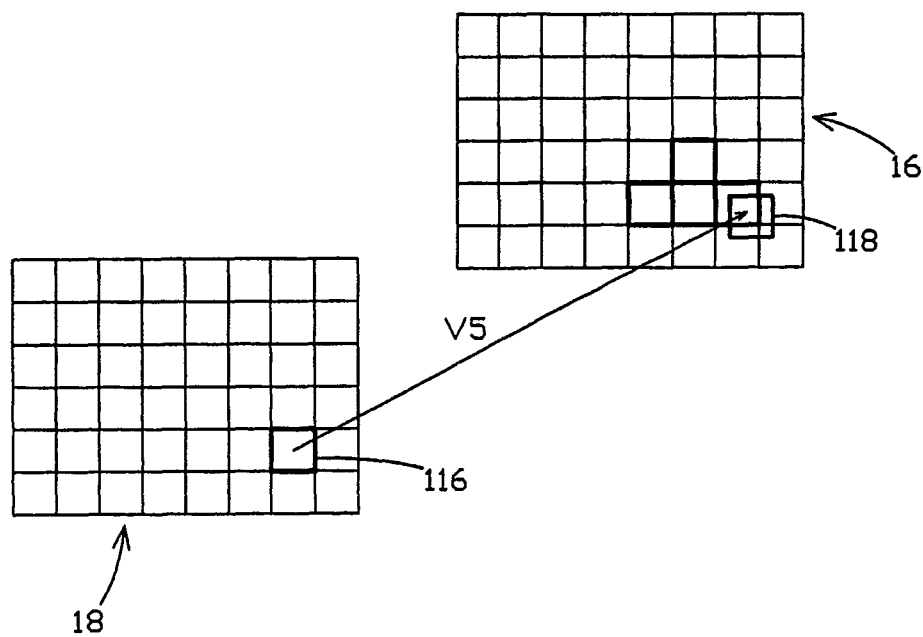

The invention will be better understood on reading the following description, given only as an example and made in reference to the figures in the appendix, in which:

FIG. 1 is a diagrammatic representation of a coder according to the invention,

FIG. 2 is a diagrammatic representation of a decoder according to the invention, FIG. 3 is a diagram of the coding method according to the invention, FIG. 4 is a schema showing the motion compensation method implemented during coding and decoding according to the invention for a portion of picture coded according to a unidirectional prediction, FIG. 5 is a diagram of a decoding method according to the invention, FIG. 6 is a schema showing the motion compensation method implemented during coding and decoding according to the invention for a portion of picture coded according to a bi-directional prediction FIG. 7 is a schema showing the coding of a second intermediary picture based on at least on a first intermediary picture, and FIG. 8 is a diagram showing a part of the coding method of a second intermediary picture based on at least a first intermediary picture.

In reference to FIG. 1, the coder 2 comprises an input 4 able to receive a video sequence 6 to be coded and an output 8 able to transmit a binary stream 10.

The video sequence 6 comprises one or more GOPs (Group Of Pictures) formed of at least two key pictures 12, 14 framing a series of pictures generally called intermediary pictures 16, 18 (at least one key picture preceding the intermediary pictures and at least one key picture following the intermediary pictures).

The key pictures 12, 14 and the intermediary pictures 16, 18 are partitioned into macroblocks, blocks, sub-blocks or regions.

The notions of macroblocks, blocks and sub-blocks are similar to the notions of "macroblocks", "partitions" and "sub-partitions" used for example in MPEG-4 and defined in the document JVT-M050d4, Draft of Version 4 of H.264/AVC (ITU-T Recommendation H.264 and ISO/IEC 14496-10 (MPEG-4 part 10) Advanced Video Coding), Palma de Mallorca, ES18-22 October, 2004

A macroblock is a set of 16×16 pixels. Such a macroblock can be partitioned into blocks of 16×8, 8×16 and 8×8 blocks. Each block being able to be partitioned into sub-blocks of 4×8, 8×4 and 4×4 pixels. The regions do not have a predefined size and correspond to zones of pictures. In the remainder of the description, the macroblocks, sub-blocks and regions are referred to as picture portions.

The coder 2 contains a motion vectors estimation unit 19 connected to the input 4, a coding decision unit 20 connected to the estimation unit 19, a coding unit 22 connected to the decision unit 20 and to the output, and a saliency map calculation unit 24 connected to the coding unit 22.

The motion vectors estimation unit 19 is able to determine for each portion of each of the intermediary pictures 16, 18 the motion vectors between this portion of the intermediary picture and, a portion of one or more intermediary pictures, a portion of one or more key pictures 12, 14, as well as for each portion of each key picture 12, 14 the motion vectors between this key picture portion and a portion of another key picture.

The motion vectors estimation unit 19 must be able to estimate the motion vectors close to a physical field that is real so that the intermediary pictures saliency maps that will be interpolated in the motion direction will be temporarily coherent among themselves and with the key picture saliency maps. Such an estimation unit is for example described in the document [*Tourapis, Au, Liou, Fast Motion Estimation using Circular Zonal Search, Proceedings of Visual Communications and Image Processing* 1999 (VCIP'99)].

As a variant, an estimation unit 19 of hierarchical spatial-temporal type can be used.

The decision unit 20 is able to determine for each macroblock of key pictures 12, 14 its coding mode (for example such as specified in section 7.4.5 of document JVT-M050d4), its partitioning into picture portions, that is its partitioning into regions, macroblocks, blocks, etc., the motion or spatial prediction information (reference pictures, associated motion vectors), the prediction residue transformed and quantified.

The coding unit 22 is to code for key pictures the coding decisions taken by the unit 20 and the associated data (coding modes, partitioning of picture portions, motion vectors and picture data, prediction residue transformed and quantified, etc.).

The calculation unit 24 calculates the saliency maps of key pictures 12, 14 from key pictures decoded locally and the coded motion data that are associated with them.

For this purpose, the calculation unit 24 uses for example the method presented in the document (O. Le Meur, P. Le Callet and D. Barba, Predicting visual fixation on video based on low-level visual features, Vision Research, Vol 47/19 pp 2483-2498, September 2007).

The coder 2 also comprises a coding mode decision unit 25 connected to the input 4 and the estimation unit 19, a coding unit 26 of coding decisions connected to the unit 25 and the output 8, and a motion compensation unit 28 connected to the coding unit 26 and the calculation unit 24.

The coding decision unit 25 is able to decide the coding mode of each picture portion of the intermediary pictures among the intra, inter unidirectional or inter bi-directional as defined in the standard H.264, the partitioning information of picture portions and the index of reference pictures. This unit 25 uses at input the data from the estimation unit 19.

The coding unit 26 codes all the coding decisions taken by the coding decision unit 25.

The compensation unit 28 is able to motion compensate the portions of the saliency maps of key pictures using motion vectors estimated by the estimation unit 19 in order to determine on the picture portions of intermediary pictures a saliency level deduced from the saliency maps of the key pictures.

The coder 2 also comprises a selection unit 30 connected to the compensation unit 28 and the estimation unit 19, as well as a coding unit 32 connected to the input 4, to the selection unit 30 and to the output 8.

The selection unit 30 is able to analyze the saliency level S of portions of the motion compensated saliency map and select a coding method of picture portions of the intermediary pictures 16, 18 according to this saliency level, as defined later.

The coding unit 32 is able to code picture portions of intermediary pictures 16, 18 using the coding method selected by the selection unit 30.

According to the embodiment described, the unit 30 can select first and second coding methods.

The first coding method is selected for the picture portions having a heightened saliency level, these portions being considered as required for preservation during coding. The first method thus aims to code the picture portion in a way that is true to the source signal, correcting by the coding of a residue possible prediction errors.

The first method can for example use all the coding modes of the H.264 standard.

The second coding method relates to the picture portions having a low saliency level, these portions being considered as being able to be returned without real fidelity to the source signal. The residue is thus not coded on these picture portions and they will only be generated by temporal prediction. So that the prediction is of an equivalent quality to the picture portions on which the residue is coded, the second method comprises a more precise motion compensation step. In particular, the second coding method is based on finer motion compensation than that employed in the first method (for example, in which the amplitude of motion vector components is equal to 1/16 pixel and not 1/4 of a pixel as in H.264, with a affine motion model and not translational as in H.264, etc.).

The fine motion interpolation can for example be realized from specified filters in MPEG-4 SVC for intra inter-layer texture interpolation, as described in table G8 of section G.8.6.2.3 of the document JVT-X201 "Joint Draft ITU-T Rec. H.264/ISO/IEC 14496-10/Amd.3 Scalable video coding" Geneva, Switzerland, 29 Jun.-5 Jul. 2007. It can also use longer support filters (more than 4 coefficients), from for example Lanczos filter models or bi-cubic filters.

The second method comprises a motion compensation and coding step based on the affine parameters.

By definition, when a zone experiences such a motion, there is a vector with six affine parameters $\theta=(a, b, \alpha, \beta, \gamma, \delta)^T$ such that the motion vector (dx, dy) of any point (x, y) of the zone can be written as:

$$\vec{\omega}_\theta(x, y) = \begin{pmatrix} dx \\ dy \end{pmatrix} = \begin{pmatrix} dx = a + \alpha x + \gamma \cdot y \\ dy = b|\beta \cdot x|\delta \cdot y \end{pmatrix}$$

As a variant, the key pictures and the intermediary pictures are not partitioned.

According to an embodiment of the invention, the pictures of the video sequence are coded according to a coding method that is scalable by layers as defined by the SVC (Scalable Video Coding) standard.

According to this scalable coding method, each layer corresponds to a different spatial resolution of the video content, from the lowest resolution coded in a layer called the base layer to the highest resolution coded in a layer called the top layer. The coding information of a layer serve in the coding of higer levels for example by using the inter-layer prediction methods.

In this case, the first coding method is based on the SVC standard with an inter-layer prediction using an interpolation with a filter with four coeffiecients and a coding of all the residue coefficients.

The second coding method is based on the SVC standard with an inter-layer prediction using a more elaborated interpolation realized for example by longer filters without residue coding.

In a variant, this second coding method also comprises a picturer contour enhancement step.

In this embodiment the saliency maps are determined from pictures from the base layer that are integrally reconstructed. In a prezferred embodiment all the key pictures of the base layer are entirely reconstructed. On these reconstructed pictures from the base layer, the saliency maps are calculated. During the coding of a picture portion of a picture from the top layer for which the base picture was entirely reconstructed, its saliency level is calculated from the saliency of the picture portion that corresponds to it in the picture from the base level. If the picture from the top layer does not have a reconstructed picture from the base layer, the saliency level is determined by motion compensation of saliency maps of key pictures of the top layer as previously described.

Alternatively other coding methods are used.

The coding method enables coding picture portions of intermediary pictures 16, 18 according to uni or bi-directional predictions from one or more key pictures 12, 14 or from other intermediary pictures. The coding and decoding methods according to the invention are described hereafter in each of these situations.

In reference to FIGS. 3 and 4, the coding method of a picture portion 54 of an intermediary picture 16 according to a uni-directional prediction, starts with a motion estimation step 43 of key pictures carried out by unit 19, a coding decision step 45 carried out by unit 20 and coding of key pictures carried out by unit 22 and a saliency map calculation step 47 of key pictures carried out by unit 24.

The coding method of the picture portion 54 continues with an estimation step 50 of partitionnings of the intermediary picture 16 and the motion vectors existing between this intermediary picture 16 and the reference key picture 12

This step is carried out by the estimation unit 19 that calculates the partitioning and motion information for each picture portion of the intermediary pictures 16.

For example in reference to FIG. 4, the estimation unit 19 estimates that there is a motion vector V1 between portion 54 of the intermediary picture 16 and portion 52 of the key picture 12. Specifically, the motion vector V1 goes from the picture portion 54 and points to the picture portion 52.

During a step 55, the decision unit 25 determines the coding mode of the picture portion 54 of the intermediary picture.

During a step 56, the coding unit 26 codes the coding decisions relating to coding modes, including the partitions and motion vectors.

When the coding mode coded by unit 26 is of intra type, the process continues directly by the coding step 74 of residual information.

During a step 64, the compensation unit 28 carries out a compensation of the saliency map 60 with motion data resulting from step 50. This consists in determining a portion 66 of the saliency map 60 so that the portion 66 is positioned in the same location in the saliency map 60 as portion 52 in the key picture 12, then in interpolating from this portion 66 a portion 72 taking account of the sub-pixel level precision of the motion vector.

Step 68 determines the saliency level S of the portion 72 of the motion compensated saliency map. The saliency information constitutes non-binary information varying typically between 0 and 255, calculated in each pixel.

The saliency level determined is the mean saliency level of the picture portion 72. As a variant, the median saliency level or the maximum saliency level of portion 72 of the saliency map is determined.

During a step 70, the selection unit 30 compares a predefined saliency level S1 to the saliency level S of the portion 72 of the motion compensated saliency map.

When the saliency level S of portion 72 is greater than the predefined saliency level 51, the picture portion 54 is coded during a step 74 by the first coding method. Only information that has not yet been coded in the preceding coding step 56 (such as prediction residue) is coded. On the contrary, motion vectors determined during a step 50 are not coded for example.

When the saliency level S of the portion 72 of the motion compensated saliency map is less than the predefined saliency level S1, the coding method continues with a step 76 during which the estimation unit 19 calculates the more precise motion vectors, for example the motion vectors for which the amplitude of the components has a level of precision greater than ¼ pixel and is, for example, equal to ¹⁄₁₆ pixel.

Then, during step 78, the picture portion 54 is coded by the coding unit 32 by the second coding method.

When the portion of the saliency map 72 offers a high level of saliency, the first coding method reproduces best the source signal by coding according to step 74. If however, the portion of the saliency map 72 offers a low level of saliency, the second coding method enables the obtaining of a picture having a visual yield though it does not reproduce exactly the coded picture.

In reference to FIGS. 3 and 6, the coding method according to the invention is described in the case of bi-directional prediction coding of a picture portion of an intermediary picture 16.

After implementation of steps 43 to 47, the estimation unit 19 estimates during a step 50 a first motion vector V1 that goes from the picture portion 54 of the intermediary picture 16 and points towards a picture portion 52 of the key picture 12 and a second motion vector V2 that goes from the picture portion 54 and points towards the picture portion 98 of the key picture 14.

During a step 55, the decision unit 25 determines the coding mode of the picture portion 54 of the intermediary picture.

During a step 56, the coding unit 26 codes the coding decisions relating to the coding modes, including the partitions and the motion vectors.

During step 64, the compensation unit 28 determines a first portion of the saliency map 66 that is positioned at the same location as the picture portion 52, and a second portion of the saliency map 100 positioned at the same location as the picture portion 98.

The portion 66 is contained in the saliency map 60 of the key picture 12 and the portion 100 is contained in a saliency map 101 of key picture 14.

During step 64, the picture portion 66 is motion compensated using the first motion vector V1 to obtain a portion 72 of the motion compensated saliency map. Likewise, the portion of the saliency map 100 is motion compensated using the second motion vector V2 to obtain a second portion 102 of the motion compensated saliency map.

In step 68 the compensation unit 28 determines the saliency level S12 of the portion 72 of the motion compensated saliency map, as well as the level S14 of the portion 102 of the motion compensated saliency map.

Then, unit 28 searches for the maximum saliency level between the saliency level S12 of the portion of the saliency map and the saliency level S14 of the portion of the saliency map 102. This maximum saliency level is compared during step 70 to the predefined saliency level S1 to select the coding method.

In a variant the mean saliency level of levels S12, S14 is considered for the comparison step.

The picture portion of the intermediary picture 16 is then coded in steps 74 and 78 from the first 12 and second 14 key pictures by a weighted sum of picture portions 52 and 98, said weighting being according to the saliency levels S12, S14 of portion 66 and 100 of the saliency map For example the following equation can be applied:

if S12≠0 or S14≠0 then pred[x,y]=pred0[x,y]*S12/(S12+S14)+pred1[x,y]*S14/(S12+S14), if not pred[x,y]=pred0[x,y]/2+pred1[x,y]/2 where (x,y) designates the coordinates of a pixel in the predicted picture portion (that is in the intermediary picture 16), pred0[ ] and pred1[ ] constituting prediction portions of portions 52 and 98, S12 and S14 represent the saliency levels of portions 52 and 98.

In a variant an additional weighting W0 is applied to the prediction portion of portion 52 and an additional weighting W1 is applied to the prediction portion of portion 98 with W0+X1=A1. These weightings W0, W1 are for example a function of the distance between the key picture 12 and the intermediary picture 16, hence the distance between the intermediary picture 16 and the key picture 14. This distance represents the number of pictures interspersed between these pictures.

In this case, the preceding equation becomes:

if S12≠0 or S14≠0 pred[x,y]=pred0[x,y]*S12*W0/(S12*W0+S14*W1)+pred1[x,y]*S14*W1/(S12*W0+S14*W1)

if not, pred[x,y]=pred0[x,y]*W0+pred1[x,y]*W1

The saliency levels S12 and S14 are defined for each picture portion. In a variant, the saliency level of each pixel of each picture portion can be considered for coding and decoding the picture portions of each intermediary picture.

According to another aspect of the invention, the intermediary pictures can in certain cases serve as references for the coding of other intermediary pictures.

In this case and in reference to FIGS. 7 and 8, the coding method of the picture portion 116 of an intermediary picture 18 is considered.

In a first step 106, the estimation unit 19 estimates a motion vector V5 that goes from the picture portion 116 of the second intermediary picture 18 and points towards a picture portion 118 of the first intermediary picture 16.

During a step 108, the number N1 of pixels coded according to the first method is enumerated in the picture portion 118 of the first intermediary picture 16.

During a step 110, the number N1 of coded pixels according to the first method is compared to a threshold Nmin. If N1 is greater than Nmin, the first coding method is selected for the coding of the picture portion 116. If not the motion vector is not considered as valid and cannot be used for the prediction and the coding of the picture portion 116 from the intermediary picture 16. The coder (and therefore the decoder) cannot use the prediction towards an intermediary picture except if the picture portion of the intermediary picture to which the motion vector is pointing contains a sufficient number of pixels coded according to the first method. In this case, the first coding method can be applied either in uni-directional mode or in bi-directional mode (another predictor from another key or intermediary picture must then be used).

In reference to FIG. 2, the decoder 34 according to the invention comprises an input 36 able to receive a binary stream 10, for example coded by the coder 2, and an output 38 able to generate a group of pictures comprising for example two key pictures 12, 14 and intermediary pictures 16, 18.

The decoder 34 comprises a decoding unit 40 for decoding the compressed data representing the key pictures 12, 14 and a decoding unit 42 for decoding the compressed data representing the motion data (pertitions, vectors, reference pictures) of intermediary pictures. Decoding unit 40 is connected to the input 36 and to the output 38. Decoding unit 42 is connected to the input 36 and to the decoding unit 40.

The decoder 34 also comprises a decoding unit 40 of compressed data representing the motion data (pertitions, vectors, reference pictures) of intermediary pictures The calculation unit 40 is connected to the input 36 and the output 38. The deding unit 42 is connected to the input 36 and the decoding unit 40.

The decoder 34 also comprises a calculation unit 44 of saliency maps of decoded key pictures 12, 14 and a motion compensation unit 46 of saliency map portions of key pictures to determine the saliency levels of picture portions of intermediary pictures.

The calculation unit 44 is connected to the decoding unit 40. The compensation unit 46 is connected to the calculation unit 44 and the decoding unit 42.

The decoder 34 also comprises a selection unit 48 of the decoding method of picture portions of intermediary pictures connected to the compensation unit 46, and a reconstruction unit 49 of intermediary pictures connected to the input 36, at the selection unit 48 and at the output 38.

The selection unit 48 is able to analyze for the picture portions of intermediary pictures the sallience levels S of portions of the motion compensated saliency map and select a decoding method for these picture portions of intermediary pictures according to the saliency levels.

The reconstruction unit 49 is able to decode the intermediary pictures 16, 18 according to a method selected from among at least first and second decoding methods.

These decoding methods corespond of course to the inverse processes of coding methods used in the coder 2, that is either decoding methods based on the H.264 standard or decoding methods based on the SVC standard.

Alternatively, other decoding methods are used

In reference to FIG. 5, the decoding method of a picture portion 54 of the intermediary picture 16 by uni-directional prediction starts with a reconstruction step 82 of key pictures, and a calculation step 83 of key picture saliency maps.

The decoding method of the picture portion 54 continues with a step 84 in which the decoding unit 42 decodes the coding mode and the partitioning information of the picture portions as well as the motion vectors defined between the intermediary pictures 16, 18 and the key pictures 12, 14.

During a step 88, the compensation unit 46 detrermines the portion of the saliency map 66 positioned in the same location as the key picture portion 52 to which is pointing the motion vector V1, as can be seen on FIG. 4 and interpolates from this portion 66 a portion 72 taking account of the sub-pixel precision level of the motion vector.

Step 90 determines the saliency level S of the portion 72 of the motion compensated saliency map.

During a step 92, the selection unit 48 compares the predefined saliency level S1 with the saliency level S of portion 72 of the motion compensated saliency map.

When the saliency level S of the portion 72 is greater than the predefined saliency level S1, the selection unit 48 selects the first decoding method to reconstuct the picture portion 54.

This first decoding method corresponds to the first coding method used in step 74.

The picture portion 54 is reconstructed using the first decoding method during step 94.

When the saliency level S of the portion 72 is less than the predefined saliency level S1, the picture portion 54 is decoded during a step 96 according to a second decoding method corresponding to the second coding method used in step 78.

In reference to FIG. 5, during the reconstruction of a picture portion of an intermediary picture coded according to a bi-directional prediction schema, the steps 82 to 88 are implemented for the first V1 and the second V2 motion vectors.

Then, during a step 90, the compensation unit 28 determines a saliency level S12 of the portion 72 of the motion compensated saliency map using the first motion vector V1 and a saliency level S14 of the portion 102 of the motion compensated saliency map using a second motion vector V2.

Then, the maximum saliency level is searched for between the saliency level S12 and the saliency level S14. This saliency level is compared during step 92 wwith the predefined saliency level S1 to select the decoding method for the intermediary picture 16.

A first portion 54 of the prediction picture and a second portion 54' of the prediction picture are reconstructed, then a picture portion is calculated from the weighted mean of the first 54 and second 54' predicted picture portions using the saliency levels and/or distances.

In parallel, during the reconstruction of an intermediary picture thus coded, the decoding method comprises the following steps:
- decode a motion vector from a portion 116 of a second intermediary picture 18 and pointing towards at least a part of a portion 118 of a first decoded intermediary picture 16,
- reconstruct the portion 116 of the second intermediary picture 18 using the portion of the first intermediary picture by the first coding method.

In a variant, the coding and decoding method can comprise several predefined saliency levels S1, S2, S3 and several coding methods presenting for example different motion vector resolutions.

The invention claimed is:

1. A method for coding pictures of a video sequence, the video sequence comprises at least one key picture and at least one intermediary picture, the method comprising the following steps:
    a) calculating a saliency map of at least one of the key picture(s);
    b) estimating for a picture portion of an intermediary picture to be coded, at least one motion vector pointing towards a portion of the key picture(s);
    c) motion compensating at least one portion of the saliency map using one or each estimated motion vector to obtain, for said picture portion, at least one portion of a predicted saliency map, and
    d) coding the picture portion according to a saliency level of each portion(s) of the predicted saliency map,
wherein step d) comprises the following steps:
    determining the saliency level of each portion(s) of the predicted saliency map;
    comparing a predefined saliency level and the saliency level of the portion of the predicted saliency map, and
    coding the picture portion using a first coding method when the saliency level of the portion is greater than the predefined saliency level and using a second coding method when the saliency level of the portion is lower than the predefined saliency level, said first coding method being a coding method with motion compensation and residue coding and said second method being a coding method with a more precise motion compensation than the motion compensation of the first coding method and without residue coding.

2. A method for coding according to claim 1, in which the first coding method is defined by H.264 standard, the second coding method being a method based on the H.264 standard in which an amplitude of components of each motion vector is greater than ¼ pixel.

3. A method for coding according to claim 1, in which the second coding method comprises coding and transmission of motion information defined by affine parameters.

4. A method for coding according to claim 1, in which the picture portion of the intermediary picture of the video sequence is coded according to a compression method that is scalable by layers, the key picture(s) being destined to be coded in a base layer, the picture portion being coded in a high layer.

5. A method for coding according to claim 1, that comprises the following steps:
    estimating a motion vector from a portion of a second intermediary picture and pointing towards at least one part of a portion of a first intermediary picture,
    counting a number of pixels of the part of the portion of a first intermediary picture,
when the number of pixels counted is greater than a predefined number,
    coding the portion of the second intermediary picture using the portion of the first intermediary picture and by the method selected to code the portion of the first intermediary picture.

6. A method for coding according to claim 1, in which during a bi-directional coding of an intermediary picture from a portion of a first key picture and a portion of a second key picture, the saliency level compared to the predefined saliency level being a function of the saliency level of a first portion of the predicted saliency map from a first motion vector, and the saliency level of a second portion of the predicted saliency map from a second motion vector; said intermediary picture portion being coded from a mean of predictions of the portion of the first key picture and the portion of the second key picture, said mean being weighted by said saliency levels of the first and the second portions of the predicted saliency map.

7. A method for coding according to claim 1, in which step a) comprises a coding step of the key picture(s), said step generating reconstructed key picture(s), the saliency map being calculated from the reconstructed key picture(s).

8. A method for decoding a binary stream comprising compressed data representative of motion vectors, of intermediary pictures and of key picture(s) of a video sequence with a view to reconstructing a picture portion of an intermediary picture to be reconstructed, the method comprising the following steps:
    a) reconstructing the key picture(s) from the compressed data,
    b) calculating a saliency map of at least one of the reconstructed key picture(s),
    c) decoding at least one motion vector for the picture portion to be reconstructed pointing towards a portion of the key picture(s),
    d) motion compensating at least one portion of the saliency map using the decoded motion vector to obtain for said picture portion to be reconstructed, a portion of a predicted saliency map, and e) reconstructing the picture portion to be reconstructed according to a saliency level of the predicted saliency map, wherein step e) comprises the following steps:

determining the saliency level of each portion(s) of the predicted saliency map, comparing a predefined saliency level and the saliency level of the portion of the predicted saliency map and reconstructing the picture portion to be reconstructed using a first decoding method when the saliency level of the portion is greater than the predefined saliency level and using a second decoding method when the saliency level of the portion is lower than the predefined saliency level, said first decoding method being a decoding method with motion compensation and residue decoding and said second method being a decoding method with a more precise motion compensation than the motion compensation of the first decoding method and without residue decoding.

9. A method for decoding according to claim 8, in which the picture portion of the intermediary picture of the video sequence is decoded according to a compression method that is scalable by layers, the reconstruction of compressed data of a base layer generating the key picture(s), the reconstruction of compressed data of a high layer generating the picture portion to be reconstructed.

10. A method for decoding according to claim 8, that comprises the following steps:

decoding at least one motion vector going from a portion of a second intermediary picture and pointing towards at least one part of a portion of a first decoded intermediary picture; the method also comprising the following steps:

counting the number of pixels of the part of the portion of the first decoded intermediary picture, when the number of pixels counted is greater than a predefined number, reconstructing the portion of the second intermediary picture using the portion of the first intermediary picture and by the method selected to reconstruct the portion of the first intermediary picture.

11. A method for decoding according to claim 8, in which during a reconstruction of an intermediary picture portion coded according to a bi-directional prediction from a portion of the first key picture and a portion of the second key picture, the saliency level compared with the predefined saliency level is a function of the saliency level of a first portion of the saliency map predicted from a first motion vector, and the saliency level of a second portion of the saliency map predicted from a second motion vector, said intermediary picture portion being reconstructed from a mean of predictions of the portion of the first key picture and the portion of the second key picture, said mean being weighted by said saliency levels of the first and second portions of the predicted saliency map.

12. A coder able to code pictures of a video sequence, the video sequence comprising at least one key picture and at least one intermediary picture, the coder comprising:

a calculation unit of a saliency map of at least one the key picture(s);

an estimation unit able to estimate for a picture portion of an intermediary picture to be coded at least one motion vector pointing towards a portion of the key picture(s);

a compensation unit able to motion compensate the portion(s) of the saliency map using the estimated motion vector(s) to obtain for said picture portion, at least one portion of a predicted saliency map, and a coding unit able to code the picture portion according to a saliency level of the portion(s) of the predicted saliency map, said coding unit comprising:

a unit able to determine the saliency level of each portion(s) of the predicted saliency map;

a unit able to compare a predefined saliency level and the saliency level of the portion of the predicted saliency map;

a unit able to code the picture portion using a first coding method when the saliency level of the portion is greater than the predefined saliency level and using a second coding method when the saliency level of the portion is lower than the predefined saliency level, said first coding method being a coding method with motion compensation and residue coding and said second method being a coding method with a more precise motion compensation than the motion compensation of the first coding method and without residue coding.

13. A decoder of a binary stream comprising the compressed data representative of motion vectors, of intermediary pictures and of key picture(s) of a video sequence with a view to reconstruct a picture portion of an intermediary picture to be reconstructed, the decoder comprising:

a reconstruction unit of the key picture(s) from the compressed data, a calculation unit of a saliency map of at least one of the reconstructed key picture(s), a decoding unit able to decode at least one motion vector for said picture portion to be reconstructed pointing towards a portion of the key picture(s), a motion compensation unit able to motion compensate at least one portion of the saliency map using a decoded motion vector to obtain, for said picture portion to be reconstructed, a portion of the predicted saliency map, and a reconstruction unit able to reconstruct the picture portion to be reconstructed according to the saliency level of the portion of the predicted saliency map, said reconstruction unit comprising:

a unit able to determine the saliency level of each portion(s) of the predicted saliency map, a unit able to compare a predefined saliency level and the saliency level of the portion of the predicted saliency map and a unit able to reconstruct the picture portion to be reconstructed using a first decoding method when the saliency level of the portion is greater than the predefined saliency level and using a second decoding method when the saliency level of the portion is lower than the predefined saliency level, said first decoding method being a decoding method with motion compensation and residue decoding and said second method being a decoding method with a more precise motion compensation than the motion compensation of the first decoding method and without residue decoding.

* * * * *